US012125466B2

(12) United States Patent
Fabry et al.

(10) Patent No.: US 12,125,466 B2
(45) Date of Patent: Oct. 22, 2024

(54) METHOD, DEVICE, HEADPHONES AND COMPUTER PROGRAM FOR ACTIVELY SUPPRESSING INTERFERING NOISE

(71) Applicant: RHEINISCH-WESTFALISCHE TECHNISCHE HOCHSCHULE (RWTH) AACHEN, Aachen (DE)

(72) Inventors: Johannes Fabry, Aachen (DE); Peter Jax, Aachen (DE); Stefan Liebich, Aachen (DE)

(73) Assignee: RHEINISCH-WESTFALISCHE TECHNISCHE HOCHSCHULE (RWTH) AACHEN, Aachen (DE)

( * ) Notice: Subject to any disclaimer, the term of this patent is extended or adjusted under 35 U.S.C. 154(b) by 200 days.

(21) Appl. No.: 17/916,384

(22) PCT Filed: Apr. 6, 2021

(86) PCT No.: PCT/EP2021/058855
§ 371 (c)(1),
(2) Date: Sep. 30, 2022

(87) PCT Pub. No.: WO2021/204754
PCT Pub. Date: Oct. 14, 2021

(65) Prior Publication Data

US 2023/0154449 A1 May 18, 2023

(30) Foreign Application Priority Data

Apr. 7, 2020 (DE) ..................... 10 2020 109 658.5

(51) Int. Cl.
*G10K 11/178* (2006.01)

(52) U.S. Cl.
CPC .. *G10K 11/17825* (2018.01); *G10K 11/17854* (2018.01)

(58) Field of Classification Search
CPC ........... H04R 1/1083; G10K 11/17815; G10K 11/17817; G10K 11/17854;
(Continued)

(56) References Cited

U.S. PATENT DOCUMENTS

2012/0170766 A1* 7/2012 Alves .................. H04R 1/1083 381/71.11
2014/0044275 A1* 2/2014 Goldstein ............ H04R 1/1083 381/71.6

FOREIGN PATENT DOCUMENTS

EP 2701143 A1 2/2014
EP 3367378 A1 8/2018

OTHER PUBLICATIONS

International Search Report and Written Opinion for PCT/EP2021/058855 dated Jul. 9, 2021.
(Continued)

*Primary Examiner* — Kile O Blair
(74) *Attorney, Agent, or Firm* — MOSER TABOADA

(57) ABSTRACT

In the method according to the invention for active noise suppression, a transfer function for a secondary path between a loudspeaker and an error microphone is measured (20). Based on the measured transfer function for the secondary path, a transfer function for a primary path between a reference microphone and the error microphone is estimated (21). Based on the estimated transfer function for the primary path, filter coefficients for filtering to generate the cancellation signal are then determined (22).

11 Claims, 8 Drawing Sheets

(58) Field of Classification Search
CPC ... G10K 2210/3025; G10K 2210/3021; G10K 2210/3048; G10K 2210/3055
See application file for complete search history.

(56) References Cited

OTHER PUBLICATIONS

Fabry Johannes et al. "Primary Path Estimator Based on Individual Secondary Path for ANC Headphones" ICASSP 2020-2020 IEEE International Conference on Acoustics, Speech and Signal Processing (ICASSP), IEEE, May 4, 2020 (May 4, 2020), pp. 456-460.
Guldenschuh Markus. "Least-mean-square weighted parallel IIR filters in active-noise-control headphones" 2014 22nd European Signal Processing Conference (EUSIPCO), EURASIP, Sep. 1, 2014 (Sep. 1, 2014), pp. 1367-1371.
Fabry Johannes et al. "Acoustic Equalization for Headphones Using a Fixed Feed-forward Filter" ICASSP 2019-2019 IEEE International Conference on Acoustics, Speech and Signal Processing (ICASSP), IEEE, May 12, 2019 (May 12, 2019), pp. 980-984.
Markus Guldenschuh. "New Approaches for Active Noise Control Headphones", Graz, Oct. 23, 2014 (Oct. 23, 2014) https://iem.kug.ac.at/fileadmin/media/iem/projects/2010/guldenschuh_diss.pdf.

* cited by examiner

METHOD, DEVICE, HEADPHONES AND COMPUTER PROGRAM FOR ACTIVELY SUPPRESSING INTERFERING NOISE

The present invention relates to a method for active noise cancellation. The present invention also relates to a device for performing the method. The invention also relates to headphones that are adapted to perform a method according to the invention or comprise an apparatus according to the invention, and a computer program with instructions that cause a computer to perform the steps of the method.

The high level of noise pollution, which is caused by airplanes, trains or cars, for example, and is perceived as ambient noise by people outside or inside these vehicles, can lead to stress and even to serious psychological and physical illnesses in the people concerned. For this reason, methods for active noise cancellation (ANC) that reduce such disturbing ambient noise are known as an important feature for headphones or so-called hearables.

This involves artificially generating an additional sound signal, which corresponds to the disturbing sound as exactly as possible, but with opposite polarity, in order to then cancel out the disturbing noise as far as possible by superimposing the two sound signals by means of destructive interference. In the case of headphones with active noise cancellation, the ambient noise is measured with one or more microphones integrated in the headphones and the portion that would still remain in the ear is then calculated using the headphones' acoustic transfer function. For this part, the opposite polarity signal is then generated in the headphones for compensation and output by means of a loudspeaker, through which the useful sound is also reproduced. Modern ANC headphones typically use fixed feed-forward and feedback filters, allowing up to 30 dB of low-frequency attenuation, but filter performance is sensitive to the fit of the headphones and the shape of the user's ears. In principle, adaptive algorithms can also be considered to improve the level of noise cancellation. However, such adaptive algorithms require high computing power and are therefore currently unsuitable in headphones, hearables or hearing aids.

Most commercially available ANC headphones are equipped with a built-in loudspeaker and two microphones. Here, one of the microphones is directed in the direction of the headphone environment in order to measure a reference signal in the form of the ambient noise and is often referred to as the reference microphone. The other microphone is directed towards the user's ear canal or eardrum to detect an internal error signal and is also referred to as the error microphone. The acoustic transmission from the external reference microphone to the internal error microphone is called the primary path, the transmission from the loudspeaker to the error microphone is called the secondary path.

A measurement of these primary and secondary paths enables an individual design and thus a significant improvement in the performance and robustness of an ANC system. The secondary path can be measured using the loudspeaker and the inner microphone, where the signal-to-noise ratio at the inner microphone is quite high due to the passive isolation of the headphones. Measuring the primary path, on the other hand, requires an additional external loudspeaker setup and a suitable measurement environment and is therefore complex and not easy for the end user to carry out.

Against this background, it is an object of the invention to provide an improved method and an improved device for active noise cancellation, in particular for suppressing disturbing ambient noise in headphones, as well as a corresponding headphone and a computer program for executing the method.

This object is achieved by a method having the features of claim 1, a corresponding device according to claim 8, a corresponding headphone according to claim 10 and a computer program according to claim 11. Preferred developments of the invention are the subject matter of the dependent claims.

The invention makes use of the knowledge that, particularly in the case of in-ear headphones, but also in the case of headphones with other designs, there can be a significant correlation between the frequency spectra of the primary and secondary paths which can be used to achieve optimization of noise cancellation without measuring the primary path.

Following this recognition of the inventors, in the method according to the invention for active noise cancellation a transfer function for a secondary path between a loudspeaker and an error microphone is measured. Based on the measured transfer function for the secondary path, a transfer function for a primary path between a reference microphone and the error microphone is estimated. Then, based on the estimated transfer function for the primary path, filter coefficients for filtering are determined to generate the cancellation signal.

In particular, at least one reference microphone detects noise signals, a loudspeaker emits a cancellation signal and an error microphone detects the remaining residual signal after the cancellation signal has been superimposed with the background noise signal.

According to one embodiment of the invention, the active noise cancellation is performed during reproduction of a useful audio signal by means of headphones, with one or more reference microphones being located on the outside of the headphones and the error microphone being located on the inside of the headphones.

Preferably, the transfer function for the secondary path is measured individually for a user and—an individual transfer function for the primary path is estimated based on the individually measured transfer function for the secondary path for the user.

In this case, the filtering is advantageously carried out by means of a forward FIR filter or IIR filter.

According to another embodiment of the invention an estimation function for the primary path is determined by measuring and analyzing both the transfer function for the secondary path and the transfer function for the primary path in advance in a training process for different people and/or fits of the headphones.

In this case, it is advantageous if

- for measured values in frequency ranges of the transfer functions, where deterministic changes are present for the primary path and the secondary path, a principal component analysis is performed with subsequent dimension reduction of the measured values obtained in the training process;
- based on principal components and mean values determined by the principal component analysis, complex gain vectors are determined for the primary paths and the secondary paths; and
- a linear mapping that minimizes the error between the determined and the estimated gain vectors of the primary paths is determined.

Accordingly, an active noise cancellation device according to the invention comprises

- at least one reference microphone;
- a loudspeaker;

an error microphone;

a digital filter for generating a cancellation signal;

a digital signal processor which is arranged to generate a measurement signal which can be output via the loudspeaker and to evaluate a signal detected with the error microphone in order to measure a transfer function for a secondary path between the loudspeaker and the error microphone;

estimate a transfer function for a primary path between the reference microphone and the error microphone based on the measured transfer function for the secondary path; and adapt filter coefficients for the digital filter based on the estimated transfer function for the primary path.

According to one embodiment of the invention, the digital filter is designed as an FIR filter or IIR filter.

The invention also relates to headphones which are adapted to perform the method according to the invention or comprise a device according to the invention, and a computer program with instructions which cause a computer to perform the steps of the method according to the invention.

Further features of the present invention will become apparent from the following description and claims in conjunction with the figures.

FIG. 1 schematically shows an in-ear headphone with an acoustic primary and secondary path;

For a better understanding of the principles of the present invention, embodiments of the invention are explained in more detail below with reference to the figures. It goes without saying that the invention is not limited to these embodiments and that the features described can also be combined or modified without departing from the protective scope of the invention as defined in the claims.

Figure 1:
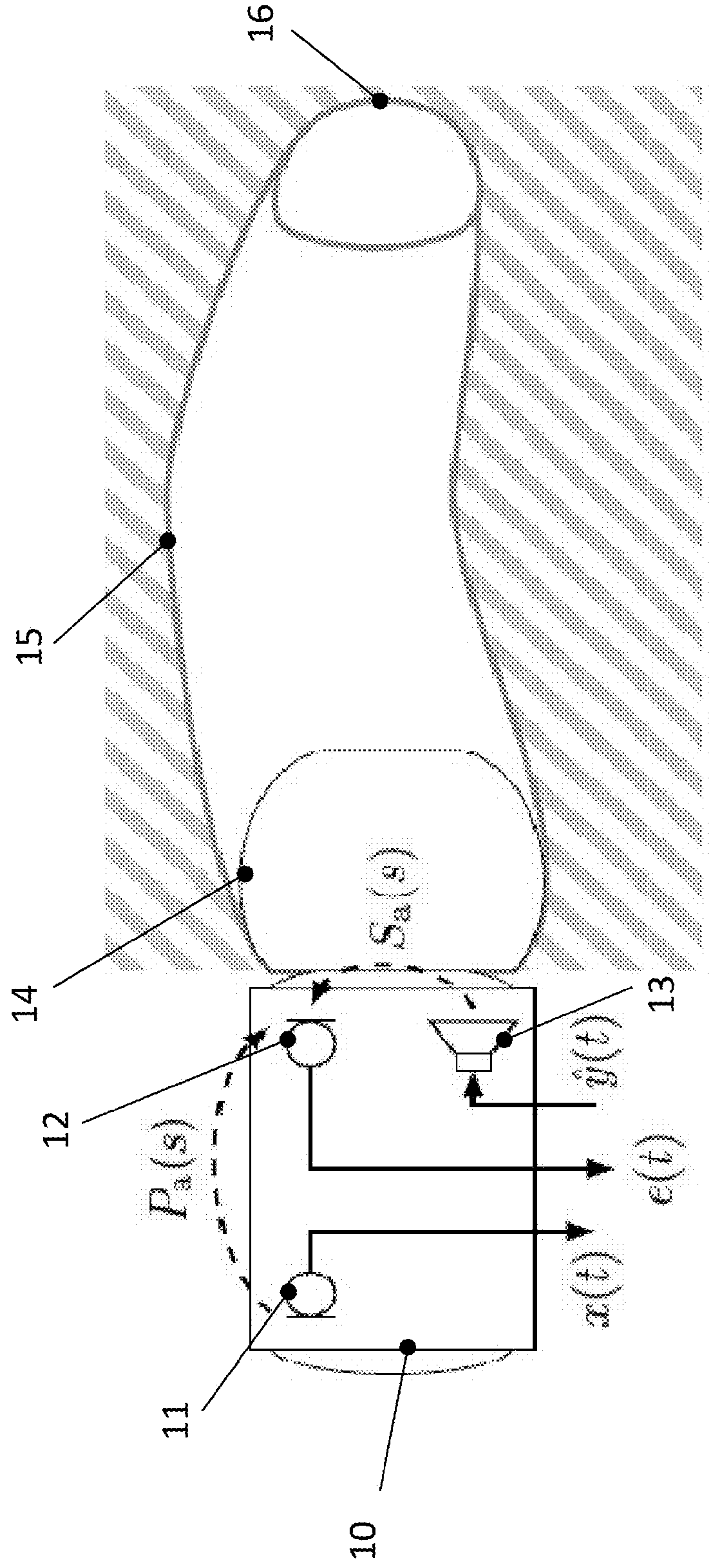

The method according to the invention can be used in particular for active noise cancellation in in-ear headphones, as shown schematically in FIG. 1. The in-ear headphones 10 are in this case located at the ear of a user, with an ear insert 14 of the in-ear headphones being inserted in the external auditory canal 15 in order to hold them in place. Depending on the individual fit in the auditory canal, the ear insert can already partially shield external noise, so that this noise only reaches the user's eardrum 16 at a reduced level.

A noise signal $x(t)$ arriving at the headphones from the environment is detected with a reference microphone 11 directed away from the auditory canal. Furthermore, the in-ear headphones 10 have an error microphone 12 which is directed towards the auditory canal 15 and a loudspeaker 13 located near the error microphone 12. A cancellation signal $\hat{y}(t)$ can be output by means of the loudspeaker 13. The error microphone 12 detects the remaining residual signal $e(t)$ after superposition of the cancellation signal $\hat{y}(t)$ with the noise signal $x(t)$. The primary acoustic path $P_a(s)$ describes the transfer function from the reference microphone 11 to error microphone 12, while the secondary acoustic path $S_a(s)$ describes the transfer function from loudspeaker 13 to error microphone 12. The in-ear headphones shown have only one reference microphone, but multiple reference microphones can also be used, each with is a separate primary path.

Figure 2:
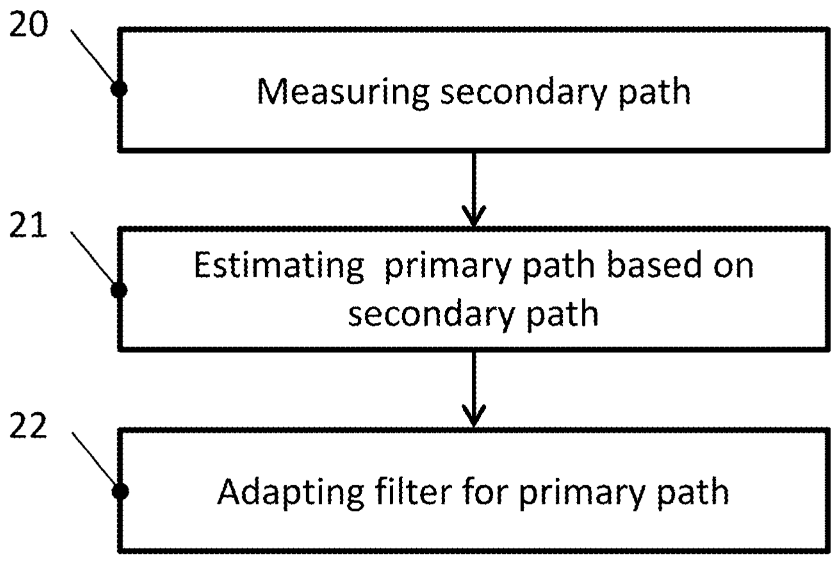
FIG. 2 shows a flow chart of the method according to the invention for active noise cancellation.

FIG. 2 schematically shows the basic concept for a method for active noise cancellation, as can be carried out, for example, with such in-ear headphones. In a first step 20, a transfer function for a secondary path between the loudspeaker and the error microphone is measured. In a subsequent step 21, a transfer function for a primary path between the reference microphone and the error microphone is then estimated based on the measured transfer function for the secondary path. For this purpose, the relationships between the primary path and the secondary path in the present headphones, which are determined in a training phase that will be described below, are used. In a further step 22, the estimated transfer function then makes it possible to determine filter coefficients for a filter for generating the cancellation signal. In this way, the filter can then be adapted in such a way that the cancellation signal that is output enables the best possible compensation for the interference signal. After the filter coefficients have been determined by measuring the secondary path and the subsequent estimation of the primary path, the filter can then be used unchanged until further notice in order to prevent or at least reduce the user's perception from being impaired by background noise when a useful audio signal is played back using the in-ear headphones. Likewise, the background noise suppression can be perceived as more pleasant by the user even without the playback of a useful audio signal, for example when traveling by train or plane and the volume level is reduced as a result.

Figure 3:
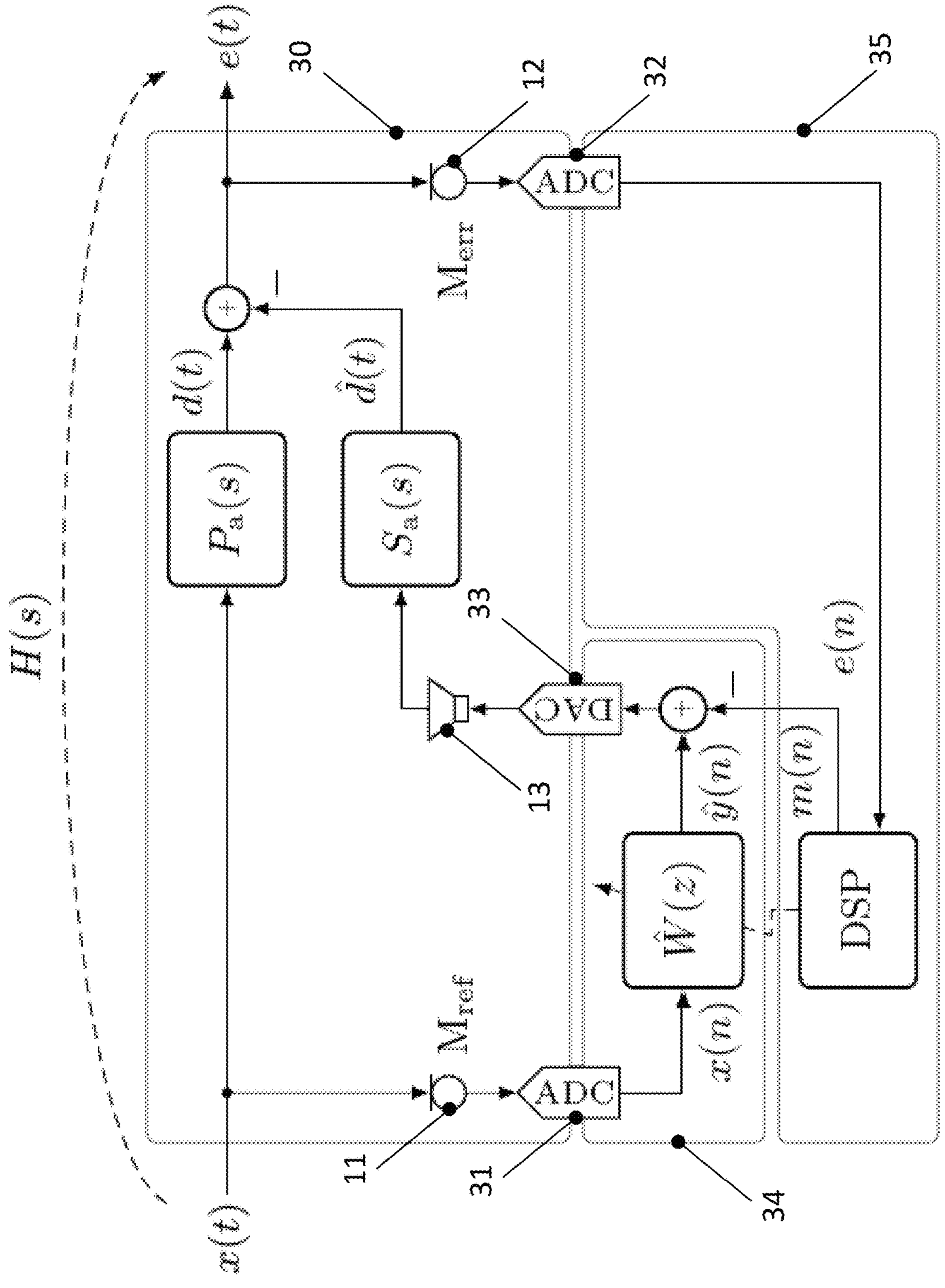
FIG. 3 shows a block diagram of a headphone according to the invention.

FIG. 3 shows a block diagram of a device according to the invention, whereby the analog unit 30 with the hardware components from FIG. 1 is extended by an electronic backend, which is connected via analog-to-digital converters 31, 32 to the microphones 11, 12 and the digital-to-analog converter 33 to the loudspeaker 13. The electronic backend includes a digital filter unit 34 and a processor unit 35.

The invention can be fully integrated into an ANC headphone or can also be a partial component of an external device, such as a smartphone. For example, the processor unit 35 may be part of such an external device.

The processor unit 35 has one or more digital signal processors, but may also include other types of processors or combinations thereof. The digital filter 34 is designed as a time-invariant FIR forward filter $\hat{W}(z)$, which receives the digitally converted interference signal $x(n)$ and generates the cancellation signal $\hat{y}(n)$. Likewise, the digital filter 34 can also be designed as an IIR filter, usually as a biquad filter. The digital signal processor 35 generates a measurement signal $m(n)$ and evaluates the digitized error signal $e(n)$ in order to measure the secondary path. Furthermore, the filter coefficients of the digital filter $\hat{W}(z)$ are adjusted by the digital signal processor. For this purpose, instructions are stored in a memory not shown, which is preferably integrated in the processor unit, which, when executed by the processor unit, cause the device to carry out the steps according to the method according to the invention.

The overall transfer function $H(s)$ describes the transfer function from the reference microphone 11 to the error microphone 12 and, in contrast to the primary path, includes the influence of the ANC system. The primary path P(z) and the secondary path S(z) contain the influence of the analog to digital converters and the digital to analog converter, the loudspeaker and the microphones.

The overall transmission path is then defined as $$H(z)=P(z)-\hat{W}(z)S(z).$$

Here, s and z designate the complex frequency parameters of the Laplace and z-transform, respectively, and n designates a discrete time index.

In the following, it will first be derived how the filter quotients for the FIR forward filter W (z) can be chosen based on the individually measured secondary path. An estimator for the primary path is then presented, which is trained based on a series of previously measured primary and secondary paths. After the training phase, measured values of an individual secondary path can then be supplied to this estimator in order to estimate the individual primary path.

Let $T=\{p_j, s_j \in \mathbb{R}^L | j=1, \ldots, J\}$ be the set of measured impulse responses of length L. The optimal FIR forward filter ω minimizes the average of the total transmission path energy, as defined by the following cost function:

$$C_w = \sum_{j\in\mathcal{T}} \|p_j^0 - s_j w\|^2$$

with the zero-extended primary path vector $p_j^0$ and convolution matrix $s_j$ for the secondary path.

The optimal FIR forward filter ω in terms of the average is given by $$\hat{w} = \underset{w}{\operatorname{argmin}} C_w = \left(\sum_{j\in\mathcal{T}} s_j^T s_j\right)^{-1} \sum_{i\in\mathcal{T}} s_i^T p_i^0$$

In order to optimize the FIR forward filter $\hat{w}$ individually, however, precise knowledge of the respective primary and secondary path is required.

As previously mentioned, the individual secondary path can be measured using the loudspeaker and the headphone's internally located error microphone. If then the individual secondary paths for all $s_j$ are substituted in the above formula and the average of the primary paths in T, i.e.

$$\overline{p} = \frac{1}{J} \sum_{j\in\mathcal{T}} p_j$$

is used as an estimate for p, then the optimal filter for a given individual secondary path is obtained:

$$\hat{w}_{avg}=(S^T S^{-1} S^T \overline{p}^0$$

Since both the primary path and the secondary path depend on the fit of the headset and the physiology of the user's ear, this correlation can be used to employ an estimator for an individual primary path based on the characteristics of a measured individual secondary path. For this purpose, the frequency ranges of the transfer functions that are affected by deterministic changes are extracted with window functions $Q_p(z)$ and $Q_s(z)$ in the z domain.

A principal component analysis (PCA) is used to extract the first $K_p$, $K_s$ principal components $U_{p,k}$, $U_{s,k} \in C^L$, and the means of a set of windowed complex frequency domain vectors of the primary path and secondary path are extracted from the set T.

The complex gain vectors $g_{p,j}$ and $g_{s,j}$ minimize the Euclidean distance between the reconstructed frequency domain vectors based on the principal components and the frequency domain vectors of the primary path and secondary path. A linear mapping a E $C^{K_p \times K_s}$ is then used, which projects the gain vectors $g_{p,j}$ of the primary path to the gain vectors of the secondary path $g_{s,j}$.

After the individual secondary path has been measured, the window function $Q_s(z)$ is applied in the z-domain to the measured secondary path and then the gain vector $g_{s,j}$ for the secondary path is calculated using the principal components and the mean value of the secondary path. Then, the amplification vector $g_{p,j}$ for the primary path is estimated using the linear mapping a, followed by an estimate of the primary path based on the principal components as well as the mean of the primary path and the estimated gain vector $g_{p,j}$ for the primary path. Finally, replacing p with the estimate of the single primary path gives the individual forward filter.

The effectiveness of the proposed estimator was checked with simulations, the results of which are presented below. For this purpose, measurements were carried out for 25 subjects and different fits on in-ear headphones, using a sampling rate of 48 kHz. The set M of measured primary and secondary paths includes a total of J=173 pairs of impulse responses.

Figure 4:
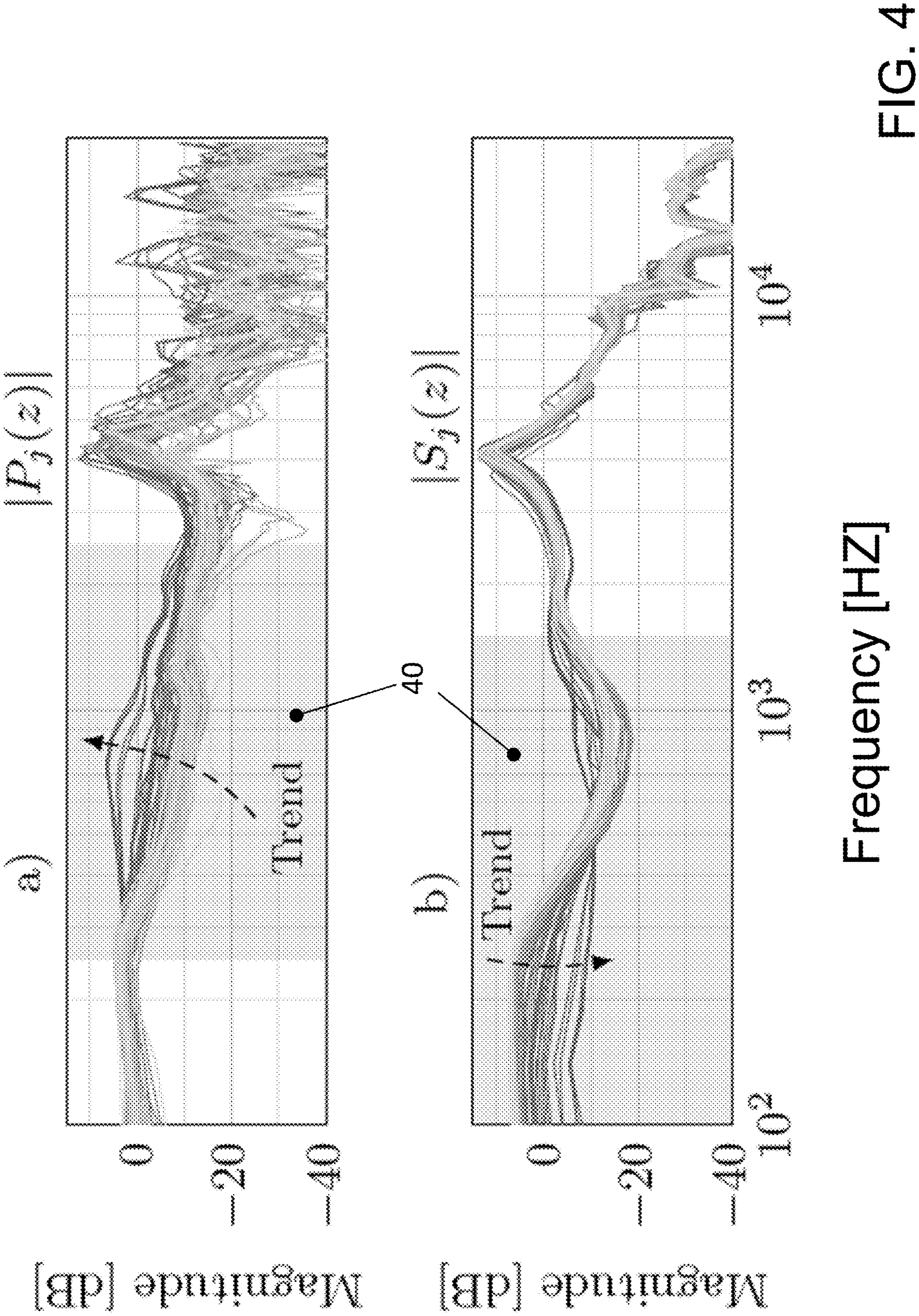
FIG. 4 shows spectra of measured primary paths (a) and secondary paths (b)

FIG. 4 shows the spectra of the measured primary paths (a) and secondary paths (b). The shaded frequency range 40 indicates the range of the selected frequency range window. The length of the primary path and secondary path was chosen to be L=1024, the length of the forward filter is $L_w$=64. The set of measured primary and secondary paths was randomly split into two subsets, with a training set containing 80% and a validation set containing the other 20% of the set of measured paths. The training set was used to train the estimator as described above. Furthermore, for the number of principal components $K_p$=1 and $K_s$=3 were chosen. The estimator's performance was then validated by testing the overall transfer path $h_j=p_j^0-s_j\hat{w}$, wherein the measurement was repeated 100 times for randomly divided subsets.

Figure 5:
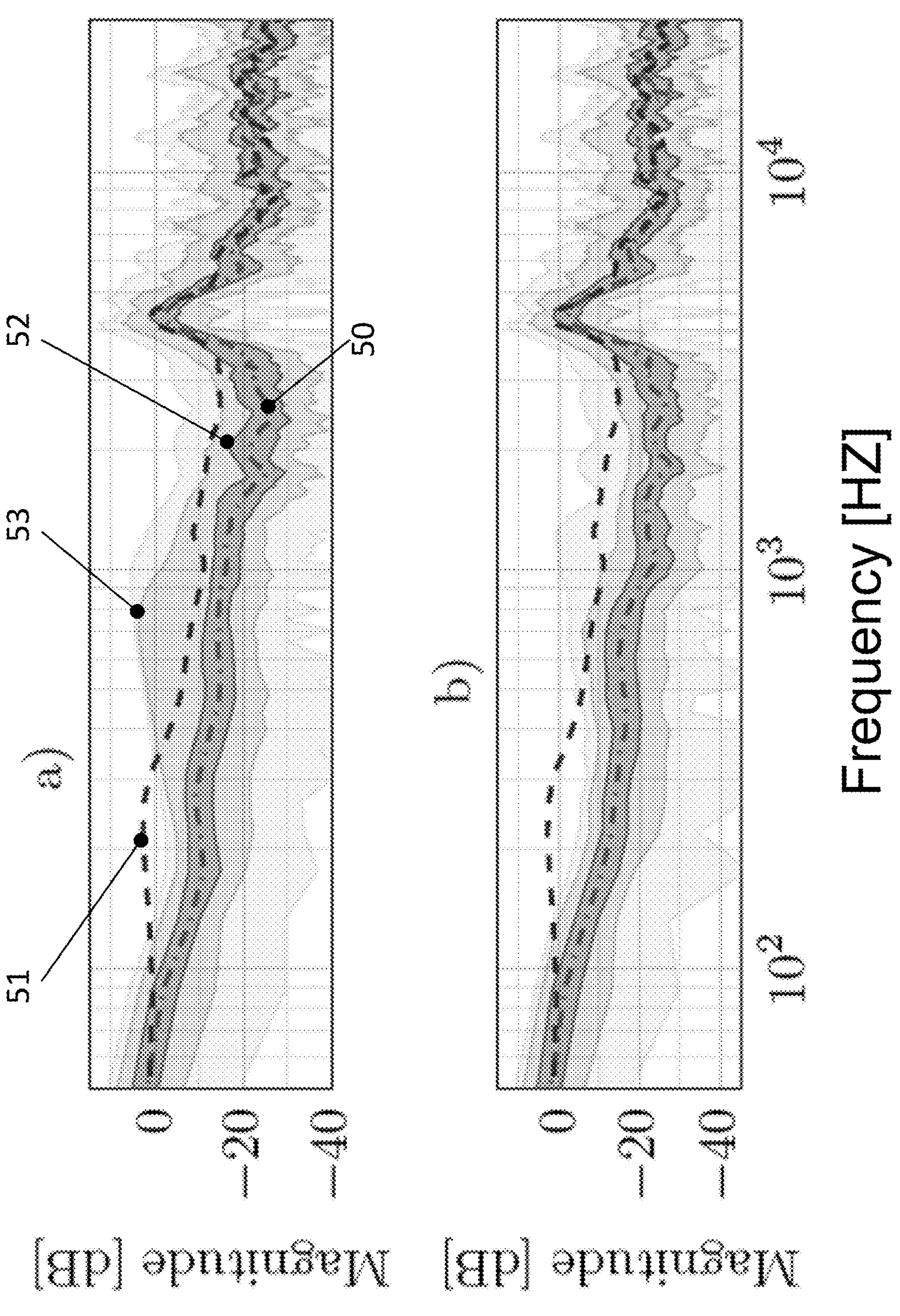
FIG. 5 shows a) measured spectra based on the individual secondary paths and the average primary path and b) measured spectra of the active transfer function from the reference microphone to the error microphone based on the individual secondary paths and the respective estimated primary path.

FIG. 5 shows the measured magnitude spectra |H(z)|, the filter design being based in a) on the individual secondary paths and the average primary path and in b) on the individual secondary paths and the respective estimated primary path. Here, in addition to the median 50, the 50% percentile 52 and the 90% percentile 53 of |H(z)| also the median 51 of the primary path |P(z)| is given to indicate the passive attenuation of the headphones.

Figure 6:
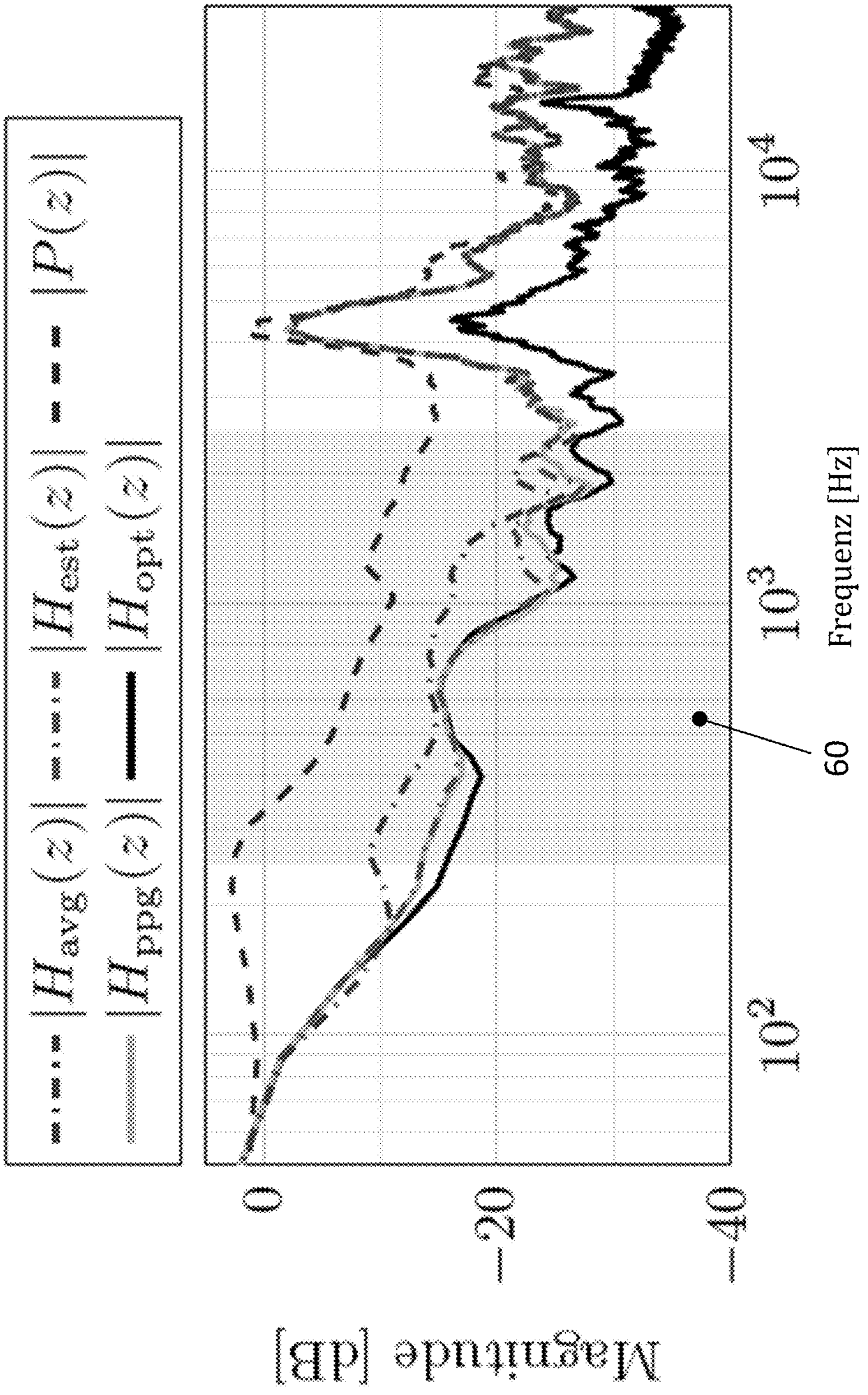
FIG. 6 shows the median of the primary path $|P(z)|$ and the spectrum $|H(z)|$ for different primary path estimates.

FIG. 6 shows the median of the primary path |P(z)| and the spectrum |H(z)| for different primary path estimates. Here, $H_{avg}(z)$ is based on the mean of the primary paths of the training set, $H_{est}(z)$ is based on a primary path estimate, same as $H_{ppg}(z)$ but using a perfect PCA gain vector (PPG) $g_p$ instead of its estimate, and finally $H_{opt}(z)$ is based on the actual primary path. The shaded area 60 in which $|Q_p(z)|>0$ applies, marks the frequency range in which H(z) is influenced by the primary path estimator. From the figure it can be seen that the median of the spectrum |H(z)| is reduced between 250 Hz and 2.5 kHz by up to 7 dB and approaches the median based on the individual primary path.

Figure 7:
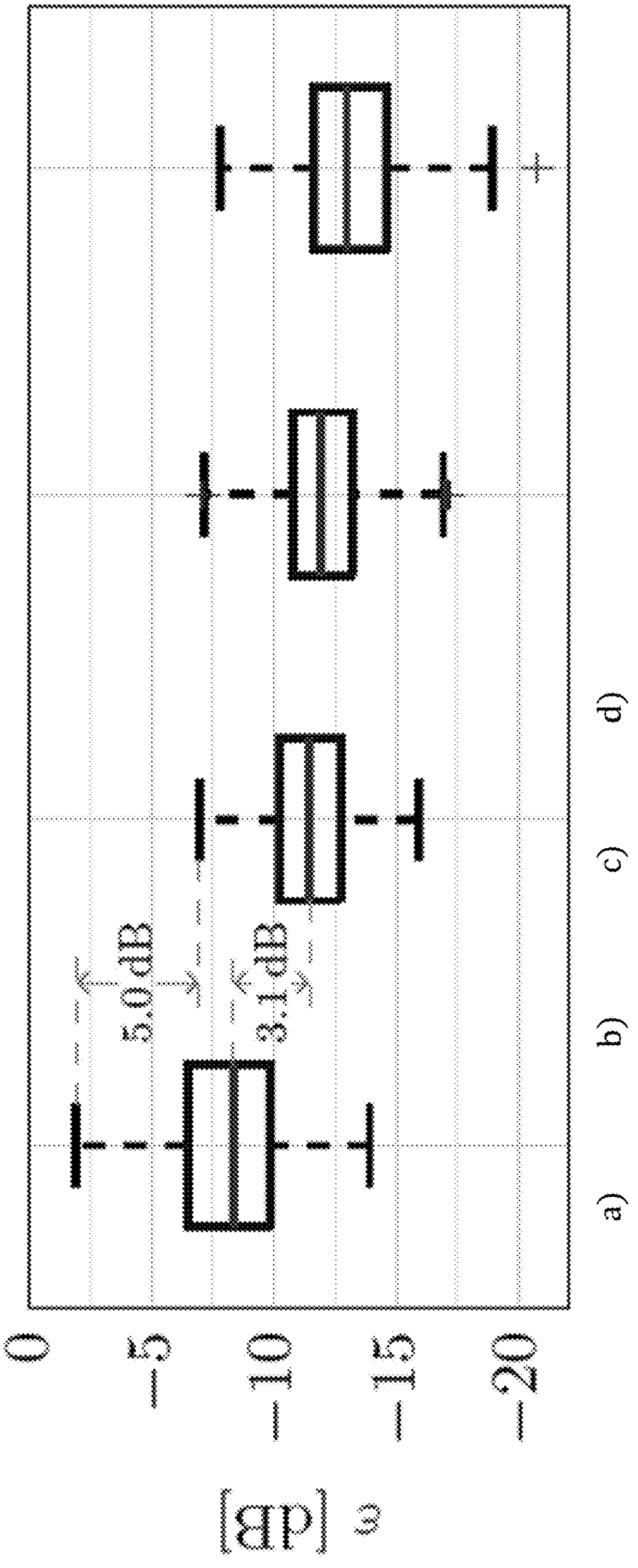
FIG. 7 shows a box graph for the energy ratio for different primary path estimates.

The box plot in FIG. 7 accordingly shows the energy ratio in dB for the various primary path estimates from FIG. 6(*a*) mean value, b) estimate, c) estimate with PPG, d) optimum when the actual primary path is known). Here the energy ratio E of the windowed total transmission path and the primary path using $Q_p(z)$ is defined as $$\varepsilon = \frac{\oint |H_{q,j}(z)|^2 dz}{\oint |P_{q,j}(z)|^2 dz}$$

For the various primary path estimates, the median as well as the minimum, the so-called lower whisker, and the maximum, the so-called upper whisker, are shown as horizontal lines and the lower quartile and upper quartile as a rectangle surrounding the median.

As can be seen from the figure, the energy ratio ε is reduced compared to using the mean value (a) when using the estimator (b) of the median by 3.1 dB, while the difference between the maximum values, the so-called upper whiskers, is 5.0 dB.

Figure 8:
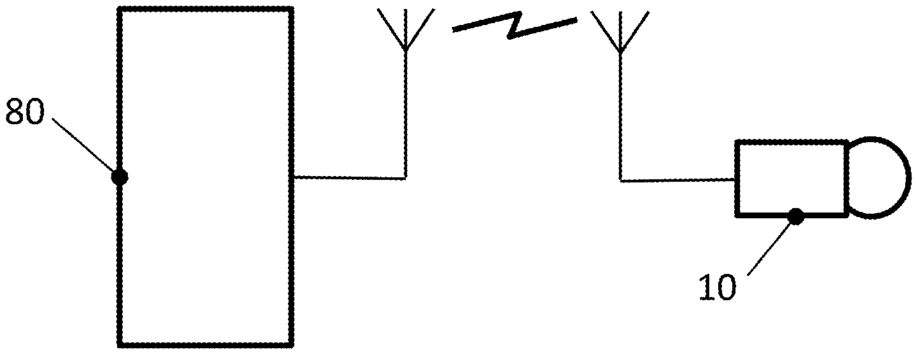
FIG. 8 schematically shows the use of a headset in connection with an external computing device.

FIG. 8 schematically shows the use of a headphone 10, such as a so-called hearable, in connection with an external computer device 80. The external computer device 80 can in particular be a mobile terminal device that is suitable for audio playback. For example, a smartphone, a so-called wearable such as a smartwatch, a fitness bracelet or data glasses, or a computer tablet can be connected to the headphones.

The devices communicate wirelessly via a radio link such as Bluetooth. After the connection has been established, audio signals can be transmitted from the external computing device 80 to the headphones 10 and then played back in a conventional manner using one or more loudspeakers integrated in the headphones.

In addition, the active noise cancellation according to the invention can also be carried out by means of the external computer device 80. For this purpose, the external computer device 80 can, in particular when a user is using the headphones 10 for the first time, transmit a measurement signal to the headphones, which is then output by a loudspeaker integrated in the headphones. An error microphone integrated in the headphones 10 then detects the error signal, which is transmitted to the external computing device 80. Based on this, the external computing device 80 calculates the secondary path, estimates the primary path and then determines the filter coefficients for the filter for generating the cancellation signal. The filter coefficients are then sent via the wireless connection from the external computer device 80 to the headphones 10, in which the filter is adjusted accordingly, so that background noise is largely suppressed when the audio signals are played back.

The invention can be used for active noise cancellation in any field of audio reproduction technology.

The invention claimed is:

1. Method for active noise cancellation, comprising measuring a transfer function for a secondary path between a loudspeaker and an error microphone;

estimating a transfer function for a primary path between a reference microphone and the error microphone based on the measured transfer function for the secondary path, wherein an estimator for the primary path is determined in advance in a training process by measuring and analyzing both the transfer function for the secondary path and the transfer function for the primary path; and determining filter coefficients for filtering to generate a cancellation signal based on the estimated transfer function for the primary path.

2. The method of claim 1, wherein at least one reference microphone detects noise signals, a loudspeaker emits a cancellation signal and an error microphone detects the remaining residual signal after the cancellation signal has been superimposed with the background noise signal.

3. The method according to claim 2, wherein the active noise cancellation is performed during reproduction of a useful audio signal by means of headphones, and one or more reference microphones are located on the outside of the headphones and the error microphone is located on the inside of the headphones.

4. The method according to claim 3, wherein the estimator for the primary path is determined by measuring and analyzing both the transfer function for the secondary path and the transfer function for the primary path in the training process for different people and/or fits of the headphones.

5. The method of claim 4, wherein for measured values in frequency ranges of the transfer functions, where deterministic changes are present for the primary path and the secondary path, a principal component analysis is performed with subsequent dimension reduction of the measured values obtained in the training process;

based on principal components and mean values determined by the principal component analysis, complex gain vectors are determined for the primary paths and the secondary paths; and a linear mapping that minimizes the error between the determined and the estimated gain vectors of the primary paths is determined.

6. The method according to claim 1, wherein the transfer function for the secondary path is measured individually for a user;

an individual transfer function for the primary path is estimated based on the individually measured transfer function for the secondary path for the user.

7. The method according to claim 1, wherein the filtering is performed by means of a forward FIR filter or IIR filter.

8. Headphones adapted to perform a method according to claim 1.

9. A non-transitory computer readable storage medium storing a computer program comprising instructions which, when executed by a computer, cause the computer to perform the steps of a method according to claim 1.

10. Device for active noise cancellation, comprising at least one reference microphone;

a loudspeaker;

an error microphone;

a digital filter for generating a cancellation signal;

a digital signal processor which is arranged to generate a measurement signal which can be output via the loudspeaker and to evaluate a signal detected by the error microphone in order to measure a transfer function for a secondary path between the loudspeaker and the error microphone;

estimate a transfer function for a primary path between the reference microphone and the error microphone based on the measured transfer function for the secondary path, wherein an estimator for the primary path is determined in advance in a training process by measuring and analyzing both the transfer function for the secondary path and the transfer function for the primary path; and adapt filter coefficients for the digital filter based on the estimated transfer function for the primary path.

11. The device according to claim 10, wherein the digital filter is designed as a forward-directed FIR filter or IIR filter.

* * * * *